(12) United States Patent
Bender et al.

(10) Patent No.: US 9,043,185 B2
(45) Date of Patent: *May 26, 2015

(54) PROMOTION OF PERFORMANCE PARAMETERS IN DISTRIBUTED DATA PROCESSING ENVIRONMENT

(71) Applicant: INTERNATIONAL BUSINESS MACHINES CORPORATION, Armonk, NY (US)

(72) Inventors: Harald Bender, Steinenbronn (DE); Karin Genther, Hildrizhausen (DE); Peter Mailand, Holzgerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/670,713

(22) Filed: Nov. 7, 2012

(65) Prior Publication Data

US 2013/0067077 A1 Mar. 14, 2013

Related U.S. Application Data

(63) Continuation of application No. 13/312,403, filed on Dec. 6, 2011.

(30) Foreign Application Priority Data

Mar. 4, 2011 (EP) .................................... 11156909

(51) Int. Cl.
G06F 11/34 (2006.01)
(52) U.S. Cl.
CPC .................................. *G06F 11/3409* (2013.01)
(58) Field of Classification Search
None
See application file for complete search history.

(56) References Cited

U.S. PATENT DOCUMENTS

| | | | |
|---|---|---|---|
| 7,480,647 B1 * | 1/2009 | Murstein et al. | 1/1 |
| 7,689,628 B2 | 3/2010 | Garg et al. | |
| 7,831,708 B2 | 11/2010 | Anstey et al. | |
| 8,442,947 B2 | 5/2013 | Veres et al. | |
| 2003/0086536 A1 * | 5/2003 | Salzberg et al. | 379/15.02 |
| 2012/0226478 A1 | 9/2012 | Bender et al. | |

OTHER PUBLICATIONS

Bender et al., Office Action for U.S. Appl. No. 13/312,403, filed Dec. 6, 2011 (U.S. Patent Publication No. 2012/0226478 A1), dated Mar. 21, 2014 (9 pages).
Bender et al., Office Action for U.S. Appl. No. 13/312,403 filed Dec. 6, 2011 (U.S. Patent Publication No. 2012/0226478 A1), dated Sep. 11, 2014 (15 pages).

* cited by examiner

*Primary Examiner* — Aditya Bhat
(74) *Attorney, Agent, or Firm* — William A. Kinnaman, Esq.; Kavin P. Radigan, Esq.; Heslin Rothenberg Farley & Mesiti P.C.

(57) ABSTRACT

A method of performance monitoring in a data processing environment is provided. The data processing environment includes multiple systems, each of which has resources. Each resource relates to a resource type, wherein at least one performance parameter is defined for each resource type. The method includes determining a value of the at least one performance parameter for at least one resource, aggregating performance parameter values and related resources of a resource type, creating for at least a part of the resources a next predefined aggregation level which includes all resources relating to the resource type and associating all performance parameter values to this aggregation level, and repeating the creating for at least a part of the resources a next predefined aggregation level until a predefined target aggregation level of the data processing environment has been reached.

9 Claims, 5 Drawing Sheets

PROMOTION OF PERFORMANCE PARAMETERS IN DISTRIBUTED DATA PROCESSING ENVIRONMENT

CROSS-REFERENCE TO RELATED APPLICATIONS

This application is a continuation of U.S. Ser. No. 13/312,403, entitled "Promotion of Performance Parameters in Distributed Data Processing Environment", filed Dec. 6, 2011, which was published on Sep. 6, 2012, as U.S. Patent Publication No. 2012/0226478 A1, and which claims priority from European patent application number EP11156909.1, filed Mar. 4, 2011, and each of which is hereby incorporated herein by reference in their entirety.

BACKGROUND

This invention relates generally to a method and an engine of performance monitoring in a data processing environment. The invention relates further to a computer system, a data processing program, and a computer program product.

Systems management tools play an important role in today's management of data centers, complex computer system structures and distributed computer systems. Modern systems management may involve one or more of the following exemplary tasks: hardware inventories, server availability monitoring and metrics, software inventory and installation, anti-virus and anti-malware management, user's activities monitoring, capacity monitoring, security management and monitoring, storage management and monitoring, network capacity and utilization monitoring, and anti-manipulation management. In particular, in cloud computing environments, monitoring an overall performance of systems is a very important task of system administrators. Systems management tools with special regard to performance monitoring are usually focusing on the entity of one single system. System programmers and performance experts can connect to multiple systems one by one and in parallel for analyzing their preferred metric or parameter values per individual system. Software agents may collect single performance parameters and relate them to the computer system the value was measured in. In a data center's world with an exploding number of virtual resources, cross system performance monitoring becomes a competitive advantage.

Several approaches have been followed in order to address performance evaluation in computing environments. Document U.S. Pat. No. 7,831,708 B2 discloses a method to aggregate evaluation of at least one metric across a plurality of resources. It may include determining an aggregate evaluation of a selected metric for a group of resources of the plurality of resources. The method may also include adjusting the aggregate evaluation of the selected metric in response to any evaluation criteria and determining if any predetermined thresholds have been violated.

Document U.S. Pat. No. 7,689,628 B2 discloses a monitoring system that enables a user to specify multiple resource elements as a resource pool, and view various aggregate information for attributes of interest for all resource elements together. Such a feature may be used in distributed environments where multiple independent resource elements need to be viewed as a single resource pool. The user is provided the flexibility to select the specific resource elements to be included in the resource pool.

Document U.S. Pat. No. 7,480,647 B1 discloses a system and method for monitoring, gathering and aggregating performance metrics of a plurality of members configured as an entity. Configurable performance metric settings can be set at a first computer and dynamically propagated to all members of the entity to establish performance metric configuration settings at each of the plurality of members.

BRIEF SUMMARY

In view of limitations of the technology of the state of the art, there is a need for an improved mechanism for better managing performance parameters and/or performance metrics in an environment of compound computing systems, or in particular in distributed computing systems.

This need may be addressed by a method of performance monitoring in a data processing environment as well as by a performance monitoring engine for performance monitoring in a data processing environment according to the independent claims.

According to one embodiment, a method of performance monitoring in a data processing environment is provided. The data processing environment may comprise multiple systems, each of which comprises resources. Each resource may relate to a resource type. At least one performance parameter may be defined for each resource type. The method may comprise determining a value of the at least one performance parameter for at least one resource and aggregating performance parameter values and related resources of a resource type. Moreover, the method may further comprise creating for at least a part of the resources a next predefined aggregation level which may include all resources relating to the resource type and associating all performance parameter values to this aggregation level, and repeating the creating for at least a part of the resources a next predefined aggregation level until a predefined target aggregation level of the data processing environment may have been reached.

BRIEF DESCRIPTION OF THE SEVERAL VIEWS OF THE DRAWINGS

Various embodiments of the invention are described below, by way of example only, with reference to the drawings, wherein.

DETAILED DESCRIPTION

Figure 1:
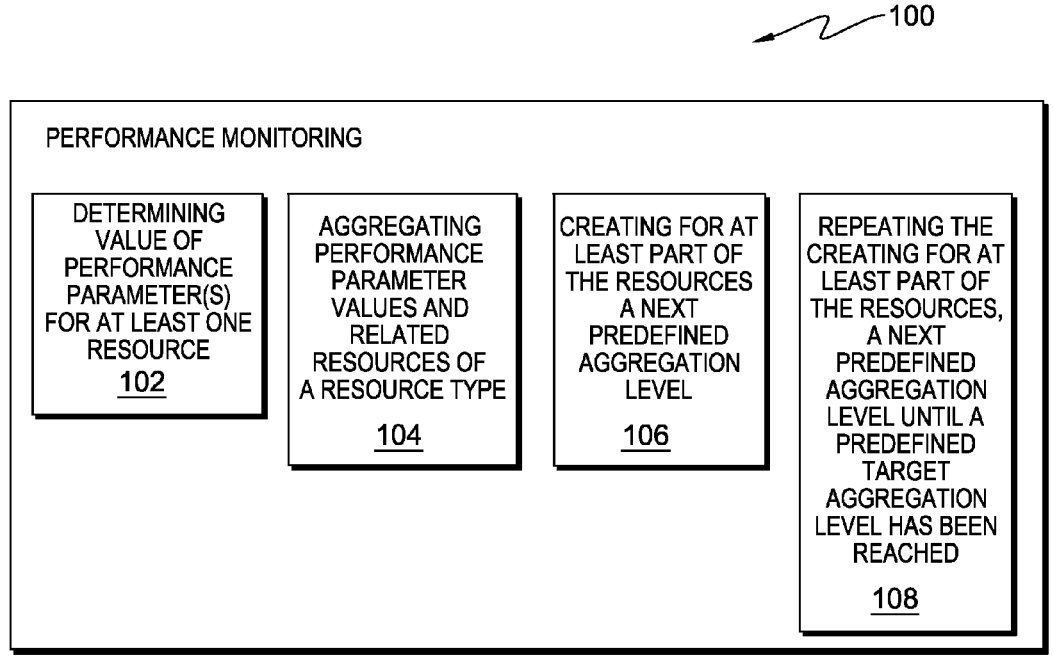
FIG. 1 depicts one embodiment of a performance monitoring method, in accordance with one or more aspects of the present invention.

In the following, a detailed description of the drawings is given. All illustrations in the drawings may be schematic. Firstly, a block diagram of the method of performance monitoring is described. Afterwards, several system components and related elements are described.

FIG. 1 depicts a block diagram of an embodiment of certain aspects of the inventive method 100 of performance monitoring. The data processing environment may comprise multiple systems, each of which may comprise resources. Each of the resources may relate to a resource type. At least one performance parameter may be defined for each resource type. The method may comprise determining, 102, a value of the at least one performance parameter for at least one resource and aggregating, 104, performance parameter values and related resources of a resource type. Furthermore, the method may comprise creating, 106, for at least a part of the resources a next predefined aggregation level which includes all resources relating to the resource type and associating all performance parameter values to this aggregation level, and repeating, 108, the creating for at least a part of the resources a next predefined aggregation level until a predefined target aggregation level of the data processing environment has been reached.

Figure 2:
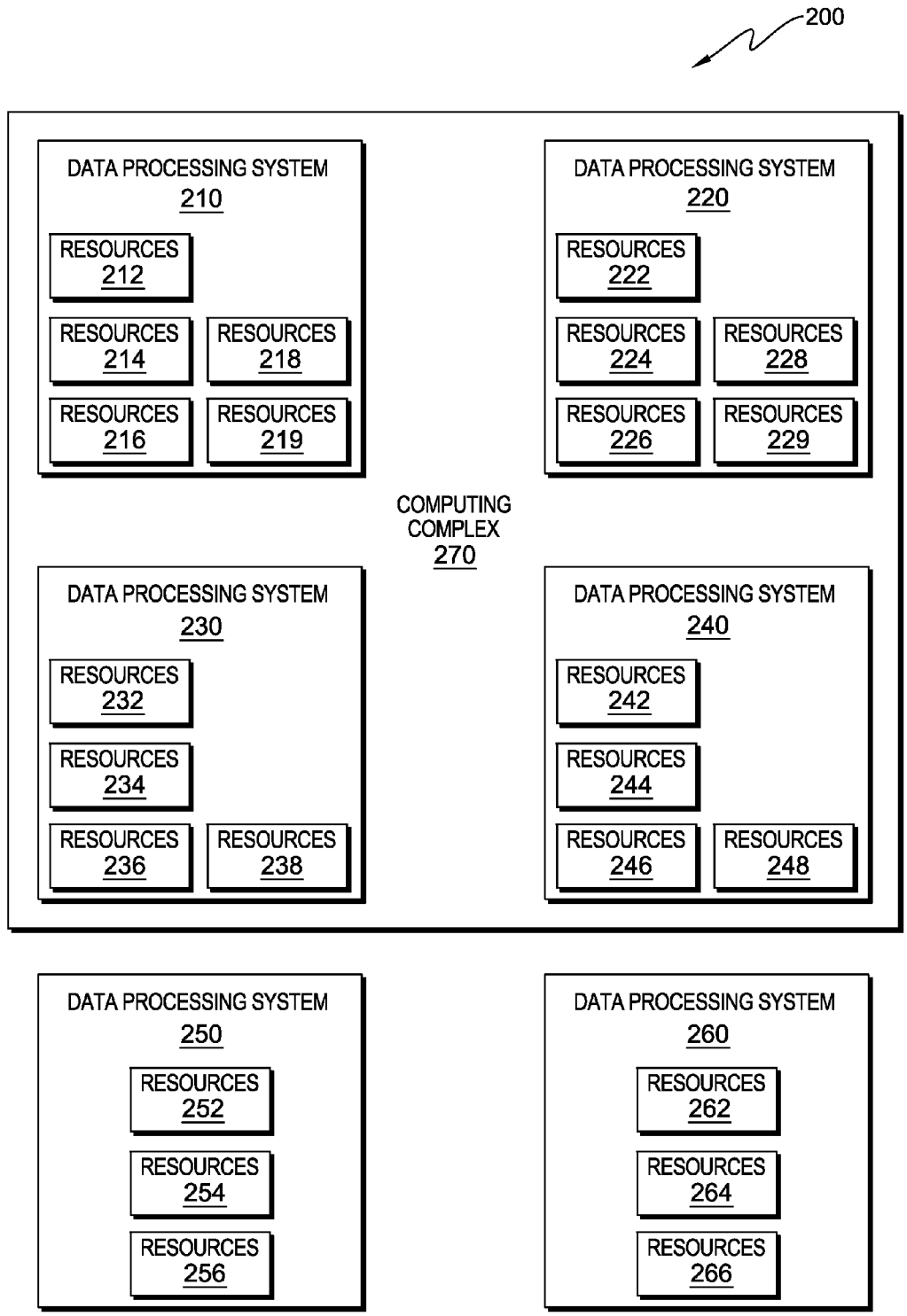
FIG. 2 illustrates one embodiment of a data processing environment to incorporate a performance monitoring method, in accordance with one or more aspects of the present invention.

FIG. 2 illustrates one embodiment of a data processing or computing environment 200 to which the method of performance monitoring may be applied to. Several data processing systems 210, 220, 230, 240, 250, 260 may define a group of computing systems. They may be located in a data center or on geographically distributed places. Each of the computing systems may have recourses. System 210 may have the resources 212, 214, 216, 218, 219. They may denote several system components defining a functional data processing system. The resources may be of physical nature or of logical nature. Computing system 220 may comprise resources 222, 224, 226, 228, 229. Computing system 230 may comprise resources 232, 234, 236, 238. Computing system 240 may comprise resources 242, 244, 246, 248. Computing system 250 may comprise resources 252, 254, 256. And computing system 260 may comprise resources 262, 264, 266. Computing system 210, 220, 230, and 240 may be aggregated together to a computing complex 270. Such a computing complex may be an extended mainframe computer as explained above.

However, it may also be possible that computing systems 210, 220, 230, and 240 may each reside in its own data center. The aggregation level 270 may then denote a logical aggregation of several data centers, e.g., in one country an enterprise may have operations, or a geographical region. All systems 201 to 260 may be linked together by one or more networks of any kind.

Several resources, e.g., resource 232 and 242 may belong to a resource type, e.g., x86 CPU type. The resource 212 may denote a "z"-processor, whereas resource 222 may denote a "p"-processor. Resources 214, 224, 234, 244 may denote main memory elements of the different systems 210, 220, 230, 240 and thus belong to the resource type main memory. The same may apply to the resources 254 and 264. Resources 219, 229, 238, 248, 256, 266 may all be network adapters having different network ports (not shown).

Figure 3:
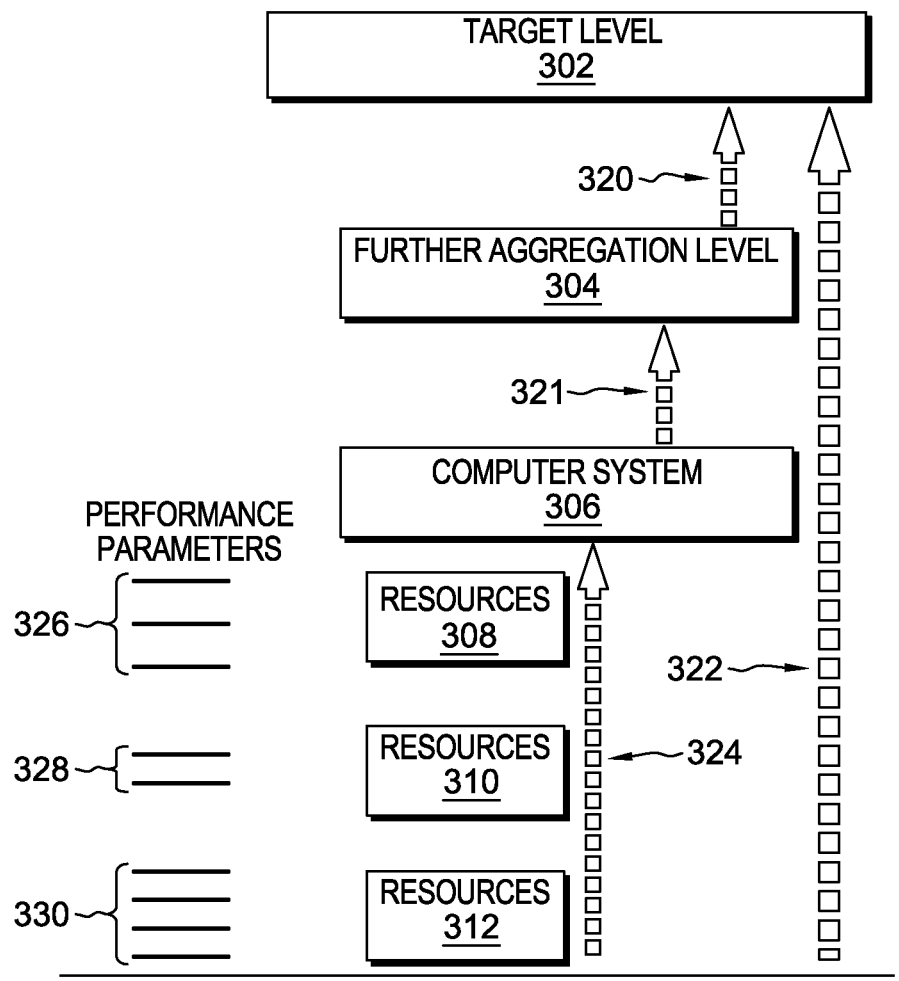
FIG. 3 illustrates schematically different logical levels of aggregation of performance parameters, which may be employed with a performance monitoring method, in accordance with one or more aspects of the present invention.

FIG. 3 illustrates schematically different logical levels of aggregations of performance parameters. Resources in the above sense may be symbolized by reference numeral 308, 310, 312. Resource 308 may be part of one resource type. Resource 310 may belong to a different resource type. And resource 312 may again belong to a different resource type. The resources may in their performance characteristic be characterized by having different parameters. For resource 308 it may be 3 performance parameters 326, for resource 310 it may be 2 performance parameters 328 and for resource 312 it may be 4 performance parameters 330. Each of the performance parameters may have values. Many other performance parameters for a large variety of resource types may be possible.

In case of three different architectures for the computing systems running three different operating systems, one may have the following embodiment: The architectures may be an x86 architecture, a Power architecture and a z-mainframe architecture. The operating systems that may be run, may be Linux on the x86 systems, AIX on the Power systems, and Linux on System z. The following resources may be possible:

TABLE 1 resources for the x86 systems:

| Resource | Explanation |
| --- | --- |
| XLINUX_SYSTEM_COMPLEX | complex of multiple Linux images running on system x |
| XLINUX_IMAGE | operating system resource of this image |
| IP_PROTOCOL_ENDPOINTS | virtual network ports |
| LOCAL_FILE_SYSTEMS | local file systems |
| NETWORK_PORTS | ports on the network adapter |
| LOGICAL_PROCESSORS | logical processors |
| PROCESSES | currently active processes |
| KVM_GUESTS | guest systems running in a KVM hypervisor environment |
| XEN_GUESTS | guest systems running in a XEN hypervisor environment |

TABLE 2 resources for the Power systems:

| Resource | Explanation |
| --- | --- |
| AIX_SYSTEM_COMPLEX | complex of multiple AIX images running on system p |
| AIX_IMAGE | operating system resource of this image |
| ACTIVE_MEMORY_EXPANSION | memory expansion management component |
| LOCAL_FILE_SYSTEMS | local file systems |
| NETWORK_PORTS | ports on the network adapter |
| LOGICAL_PROCESSORS | logical processors |
| PROCESSES | currently active processes |
| PARTITION | logical partition where this operating system may be running |
| DISKS | logical volumes or disks |
| MEMORY | memory resource |
| SHARED_ETHERNET_ADAPTERS | shared Ethernet adapters |
| ACTIVE_MEMORY_SHARING | memory sharing management component |
| VIRTUAL_TARGET_DEVICE | devices which are applicable for virtualization |

TABLE 3 resources for the z-architecture systems:

| Resource | Explanation |
| --- | --- |
| ZLINUX_SYSTEM_COMPLEX | complex of multiple Linux images running on system z |
| ZLINUX_IMAGE | operating system resource of this image |
| IP_PROTOCOL_ENDPOINTS | virtual network ports |
| LOCAL_FILE_SYSTEMS | local file systems |
| NETWORK_PORTS | ports on the network adapter |
| LOGICAL_PROCESSORS | logical processors |
| PROCESSES | currently active processes |
| CEC | central electronic complex |
| LPAR | logical partition where this operating system is running |
| CHANNELS | I/O channels |
| VOLUME | logical volumes or disks |

In one example, resource 308 may be a network port—either physical or logical—of a network adapter (not shown)

of a computer system 306. At regular or variable instances of time, performance parameter values 326 of the network port may be determined. They may indicate performance parameter values like, e.g., bytes received, bytes transmitted, and error rate or network collision rate of the network port 308. Several network ports 308 may be present in a computer system 306 of which a plurality may be present in a computing environment.

Another example may be resource 312 which may represent, e.g., a file-system. At regular or variable instances of time, performance parameter values of the file-system may be determined. These may comprise, e.g., blocks read, blocks written, total capacity, and free space. Several file-systems may be present in computer system 306.

All exemplary values of the performance parameters 326, 328 and 330 may be aggregated at computer system level 306. Up to here, the aggregation may be seen as a single-value metric because all resources of a computer 306 may be related to the single computer system 306.

However, if the aggregation of performance parameter value may be performed for a plurality of resources 306 (in the above example a specific network port) of the resource type "network port" on a next aggregation level, e.g., level 304, which may, e.g., represent a blade system comprising a plurality of computer systems 306, then we may no longer deal with a single-valued metric but a list-valued metric. All e.g., network ports 308 of all computer systems 306 may be made accessible on the aggregation level 304 leaving out the intermediate aggregation level 306 represented by a computer system. The aggregation to the first abstraction level 306 may be symbolized by arrow 324. The aggregation to the next abstraction level may be symbolized by the arrow 321.

In one embodiment, the plurality of systems 306 may not all be computing systems. Parts of all systems 306 may be storage subsystems while others may represent backup devices like tapes or optical disks. In those cases, the resource 308, 310, 312 may have other characteristics and other performance parameters with—of course—different values. It may also be noted that all determined values may vary over time.

The systems 306 may also represent computing systems having different architectures—e.g., different types of CPUs—like a mainframe architecture, a RISC (reduced instruction set computer) and a commodity CPU, like an x86 CPU. In this case, aggregation level 304 may represent a data processing environment in the form of a computing complex. Several systems 306 of different architectures may be part of such a computing complex. In one embodiment, a computing complex 304 may represent an extended mainframe computer with one or more central electronic complexes (CEC) and a variety of additional systems 306 with different architectures and different operating systems.

There may also be an additional level 302 of integration, aggregation and abstraction, e.g., a target level. This may represent a complete data center comprising a plurality of systems 304 and/or individual systems 306 or any combination of those systems. The systems may be geographically distributed, in one building, in one cage or rack or in any other form of regular or irregular dependency. Some of the systems may even be mobile devices connected via a mobile network to at least parts of the other systems.

However, the inventive method may allow comprehensively displaying and thoroughly analyzing performance parameter values—e.g., relating to performance parameters 326 or 328, and/or 330—at a predefined aggregation level without being disturbed by relationships and hierarchical levels of intermediate levels relating to systems the resources may physically belong to. This may allow a large degree of transparency for system administrators and systems managers. It may immediately become visible on the level of the data processing environment comprising multiple systems which e.g., network ports may represent a performance bottleneck. This may, in particular, be important if certain network ports may be used by multiple systems. It may be obvious that network ports may only be used as an example for any other type or instance of a resource. It may also be clear that arrow 322 may represent a logical aggregation from bottom end resources, e.g., 308, 310, 312 to the highest predefined aggregation level that may be reached by repeating an aggregation from level to level. Arrow 320 may represent an aggregation from the subordinate level to a top level.

Another embodiment may allow that newly deployed resources of new types at the level of the resources 308, 310, and 312 may identify themselves so that they may be ready for an aggregation from level to level.

Figure 4:
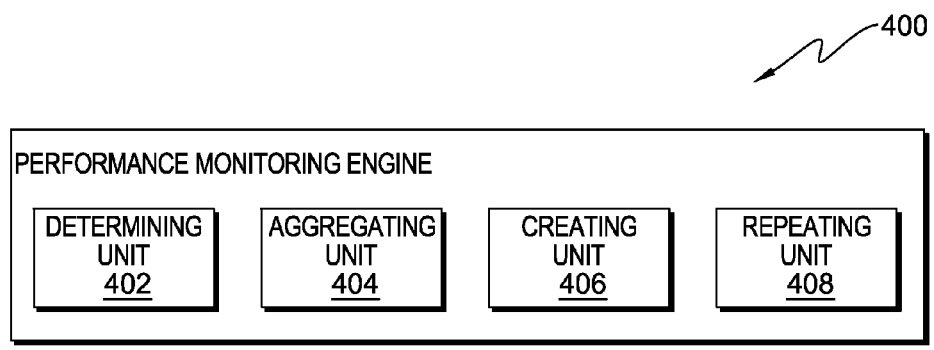
FIG. 4 depicts one embodiment of a performance monitoring engine, in accordance with one or more aspects of the present invention.

FIG. 4 shows one embodiment of a performance monitoring engine 400 for performance monitoring in a data processing environment. The data processing environment may comprise multiple systems as outlined above. Each of the systems may comprise resources. Each resource may relate to a resource type as explained above. At least one performance parameter may be defined for each resource type. The performance monitoring engine may comprise a determining unit 402 adapted for determining a value of the at least one performance parameter for at least one resource, and an aggregating unit 404 adapted for aggregating performance parameter values and related resources of a resource type. Furthermore, the performance monitoring engine may comprise a creating unit 406, adapted for creating for at least a part of the resources a next predefined aggregation level which includes all resources relating to the resource type and associating all performance parameter values to this aggregation level, and a repeating unit 408, adapted for repeating the creating for at least a part of the resources a next predefined aggregation level until a predefined target aggregation level of the data processing environment has been reached. Such an engine may perform the process described in the context of FIG. 3.

Figure 5:
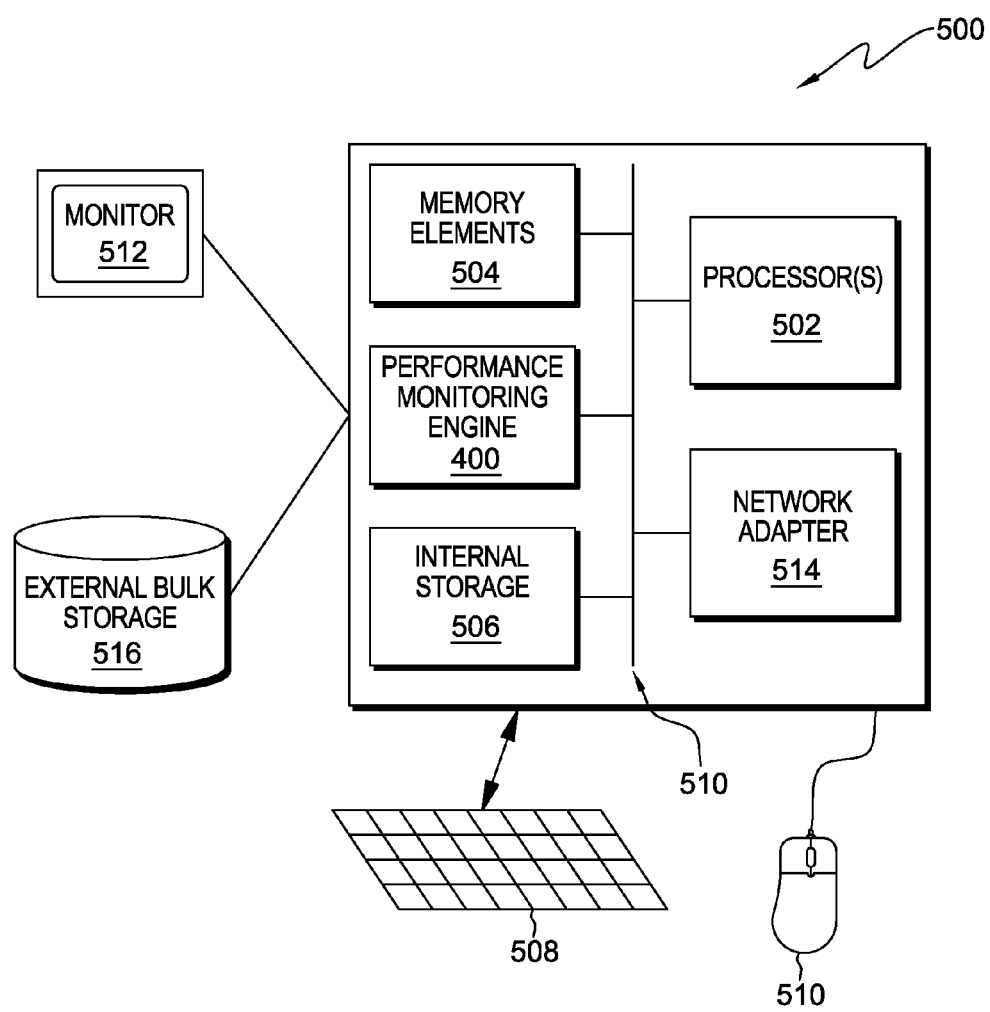
FIG. 5 depicts one embodiment of a computer system comprising a performance monitoring engine, in accordance with one or more aspects of the present invention.

Embodiments of the invention may partly be implemented on virtually any type of computer, regardless of the platform being used suitable for storing and/or executing program code. For example, as shown in FIG. 5, a computer system 500, may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities typical of today's computers (not shown). The memory elements 504 may include a main memory, employed during actual execution of the program code, and a cache memory, which may provide temporary storage for at least some program code or data in order to reduce the number of times, code must be retrieved from external bulk storage 516 for execution. Elements inside the computer 500 may be linked together by means of a bus system 518 with corresponding adapters. Additionally, a performance monitoring engine 400 may be part of the computer system 500.

The computer system 500 may also include input means, such as a keyboard 508, a mouse 510, or a microphone (not shown). Furthermore, the computer 500 may include output means, such as a monitor 512 [e.g., a liquid crystal display (LCD), a plasma display, a light emitting diode display (LED), or a cathode ray tube (CRT) monitor]. The computer system 500 may be connected to a network (e.g., a local area network (LAN), a wide area network (WAN), such as the Internet, or any other similar type of network, including wireless networks via a server network adapter 514. This may allow a coupling to other computer systems. Those, skilled in the art will appreciate that many different types of computer systems do exist, and the aforementioned input and output means may take other forms. Generally speaking, the computer system 500 may include at least the minimal processing, input and/or output means, necessary to practice embodiments of the invention.

Further, those skilled in the art will appreciate that one or more elements of the aforementioned computer system 500 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smartphone.

Further, software instructions to perform embodiments of the invention may be stored on a computer readable medium, such as a compact disk (CD), a diskette, a tape, or any other computer readable storage device.

It may be noted that the data processing environment may be a distributed data processing environment, wherein not all computing elements (e.g., disks, subsystems) or more complete systems may be provided at one physical place. On the other side, and in a particular embodiment, the computing systems comprised in the data processing environment may be aggregated into one computing complex combining different computing architectures, e.g., different CPUs (central processing units). This may be, for example, the case in a mainframe computer like an IBM zEnterprise System with BladeCenter Extensions®.

Distributed systems may, in particular also relate to geographically distributed systems such that a part of the systems may be located in a data center and another part of the systems may be located in various locations at different geographical places.

The term determining in the method may, in particular, have the meaning of capturing, measuring or evaluating. It may also be noted that the aggregation or aggregation performance parameter values and related resources of a resource type may also comprise providing a joint view of all resources of the same type originating from different systems and aggregation levels, in particular at different geographical locations.

In the context of this application, the following principle terms are used:

Performance monitoring—The term performance monitoring may denote activities that allow an evaluation of performance parameters of a system. It may comprise any parameter that may indicate any performance characteristic, like e.g., speed, throughput, number of users, traffic, error rate, etc. Performance monitoring may comprise measuring performance parameters and visualize them.

Multiple systems—The term multiple systems may, in this context, denote several alternatives. The multiple systems may be placed like normal computing systems in a data center, sitting side-by-side in racks. However, they may also be positioned in different geographical locations. Also, parts of the system may be distributed. E.g., the CPU may be positioned in one place, a larger part of a memory may be positioned at a different place, storage disks may again be at a different place and other periphery adapters again in different places. The same applies to any interaction devices attached to parts of the system. However, a relevant plurality of systems may be located in one physical place and additionally inside one computing complex comprising different CPUs based on different architectures potentially running different operating systems. This may be the case with a mainframe computer that integrates a wide range of different subsystems. All of the multiple systems may be integrated into one common housing with common power supplies, common cooling, common input/output connectors. The system may be managed like one common computing complex running several virtual machines. All systems may be connected via networking facilities.

Resource—The term resource may denote any identifiable component of a computer system or subsystem, wherein the subsystem be isolated from the system. Resources may be of physical nature, like e.g., CPU, main memory, hard disks, network adapters, network ports, etc. The resources may additionally or alternative be of logical nature, like e.g., users, files, virtual machines, connections, logical volumes, partitions, address spaces, etc. It may be noted that resources may be actual instances of resources of any type.

Resource type—The term resource type may denote a class of resources sharing joint characteristics. Examples may be network ports or disks, CPU, memory. A resource type may be an abstraction of a resource. Several resources or resource instances may belong to one resource type. A file-system type may, for example, be a logical resource type.

Performance parameter—The term performance parameter may denote a measurable parameter or metric that may characterize a performance adjective of a resource. One resource may have a plurality of performance parameters of metrics. Performance parameters may change their values over time. Examples of performance parameters may comprise number of users, memory size, hard disk space free/used, compression rates, throughput rates, error rates, blocks transferred, cooling air volume, temperature, etc. Basically, any measurable physical attribute may be a performance parameter. Performance parameters may be determined, measured, and/or evaluated.

The above-described method of performance monitoring may provide a couple of advantages. In particular, the method may allow a common view on specific resources of all systems in a computing complex, particularly an extended mainframe computer comprising several dedicated individual and different systems under one central operating management, treating the data processing environment as one virtual system. This may not only allow a resource monitoring system-by-system but across all systems. It may also allow an aggregation and propagation from level to level of a complex system. It may also allow self-identification of new resources, new resource types, or newly identified resource parameters. These features and advantages may not have been used in a combination with either distributed or compacted systems like the extended mainframe computer mentioned above. An aggregation or promotion of parameters may be possible across a plurality of data processing environments. The number of levels may not be fixed.

In one embodiment, the method may comprise propagating a new resource type of the data processing environment and at least one related performance parameter value to the next predefined aggregation level. This may in particular, be performed automatically. No manual interaction and/or definitions and/or relationship definitions may be required. I.e., a classification may be extended. If, e.g., a new resource may have been added to the data processing environment, it may identify itself including its resource type and potential performance parameter value. This may allow a performance monitoring without predefined resource classes and predefined performance parameters. Instead, the data processing environment may become self-defining and self-extending in terms of a description of resources and its performance parameters.

In another embodiment of the method the multiple systems may differentiate themselves from each other by having different architectures. In particular, the CPU architectures may be different. This may have consequences for the type of behavior of remaining components, i.e., resources of a system. Examples of CPU architectures or CPU types may be x86 Architecture®, Power® architecture, z-Architecture®, Cell® system architecture, Sparc architecture, Prism® architecture, ARM® architecture, etc.

In an alternative embodiment of the method, the multiple systems may run different operating systems. An operating system may be available under open source licences like Linux or as a proprietary product, such as Windows®, AIX®, HP-UX®, zOS®, VM®, iOS®, i5/OS®, etc. There may also be run several operating systems on one hardware architecture, i.e., one CPU using a hypervisor.

In another embodiment of the method, the multiple systems may be part of one computing complex. Such a computing complex may be a mainframe computer with extension for other architecture type extensions. An example may be an IBM zEnterprise System with BladeCenter Extensions®. In such a system different computing resources of different architectures may be combined in an overall architecture. The part systems, e.g., a "z" related system (having a z-architecture), a "p" related system (having a Power architecture), and an x86 architecture based system may either work as a standalone system or may function as one integrated system and be operated as one virtual computing resource.

In another embodiment of the method, the resource type may be a network port type and the at least one performance parameter may comprise at least one out of the group consisting of bytes received, bytes transmitted, and error rate. With such a selection for a resource type an integrated, aggregated view across all partial systems of the data processing environment may be possible. A link to individual systems apart from a highest aggregation level may no longer be required. A logical relationship between a highest instance of computing resources, e.g., an integrated computing complex or a complete data center and low level resources like network ports may be provided. Intermediate levels of systems may be blocked within such an aggregation, which may also be displayed to system administrators.

In a further embodiment of the method, the resource type may be a file-system type and the at least one performance parameter may comprise at least one out of the group consisting of blocks read, blocks written, total capacity, and free space. This embodiment may relate to a logical construct, e.g., a file-system, instead of physical entities. Other logical resource types may be used.

In just another embodiment of the method, the resource type is a memory expansion type and the at least one performance parameter comprises at least one out of the group consisting of memory expansion factor, true memory size, compressed pool size, and compressed pool pages. This resource type may allow a dedicated performance monitoring of memory used in parts of the data processing environments. The memory may be dedicated to a specific processor or it may be shared by several processors. This feature may allow a fine grained performance monitoring at a low level of the plurality of systems.

In yet another embodiment of the method the resource type may be a hypervisor and the at least one performance parameter may comprise at least one out of the group consisting of global CPU capacity, kernel mode time, user mode time, and total CPU time. Here again, a logical resource type may be monitored at different aggregation levels of the data processing environment. If, e.g., a plurality of servers, i.e., computing systems may be used, virtual environments may be monitored. A highest aggregation level may be a data center or a plurality of data centers that may, in addition, be geographically distributed.

In one embodiment, the performance monitoring engine may be a component of a computer system. Such a system may be part of the computing environment. This may allow that the performance monitoring according to the method of performance monitoring may be performed within the computing environment itself. However, the performance monitoring engine as well as the computer system comprising the performance monitoring engine may be outside of the data processing environment.

It should be noted that embodiments may take the form of an entire hardware implementation, an entire software embodiment or an embodiment containing both, hardware and software elements. In a preferred embodiment, the invention may be implemented in software which includes, but is not limited to, firmware, resident software and microcode.

In one embodiment, a data processing program for execution in a data processing system may be provided comprising software code portions for performing the method, as described above, when the program may be run on a data processing system. The data processing system may be a computer or computer system.

Furthermore, embodiments may take the form of a computer program product, accessible from a computer-usable, or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, and features of the apparatus type claims, is considered as to be disclosed within this document.

The various aspects defined above and further aspects of the present invention will be apparent from the examples of embodiments described herein and explained with reference to the examples of embodiments, but to which the invention is not limited.

While the invention has been described with respect to a limited number of embodiments, those skilled in the art, benefiting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

What is claimed is:

1. Method of resource performance monitoring in a data processing environment, wherein the data processing environment comprises multiple systems and multiple resources, each system of the multiple systems comprising one or more resources of the multiple resources, wherein each resource comprises an identifiable component isolatable from one of the multiple systems and relates to a resource type of a plurality of resource types of the data processing environment, and wherein at least one performance parameter is defined for each resource type of the plurality of resource types, the method comprising:

determining a value of the respective at least one performance parameter for a subgroup of resources of at least one resource type of the plurality of resource types in the data processing environment, aggregating determined performance parameter values of the subgroup of resources, creating a predefined logical aggregation level which includes all resources in the subgroup and for automatically associating the performance parameter values to this predefined logical aggregation level, and automatically repeating the creating for at least a part of the resources of the resource type one or more further predefined logical aggregation levels, above the predefined logical aggregation level, wherein each of the one or more further predefined aggregation levels comprises more resources than a previous level and comprises resources in the previous level, until a predefined target aggregation level of the data processing environment has been reached, and a logical hierarchy of resources of the resource type has been obtained.

2. The method according to claim 1, further comprising automatically propagating a new resource type of the data processing environment and at least one related performance parameter value to the next predefined aggregation level.

3. The method according to claim 1, wherein the multiple systems have different types of architectures.

4. The method according to claim 1, wherein the multiple systems run different types of operating systems.

5. The method of claim 1, wherein the multiple systems are part of one computing complex.

6. The method of claim 1, wherein the at least one resource type comprises a network port type and the at least one performance parameter associated therewith comprises at least one of bytes received, bytes transmitted, or error rate.

7. The method of claim 1, wherein the at least one resource type comprises a file-system type and the at least one performance parameter associated therewith comprises at least one of blocks read, blocks written, total capacity, or free space.

8. The method of claim 1, wherein the at least one resource type comprises a memory expansion type and the at least one performance parameter associated therewith comprises at least one of memory expansion factor, true memory size, compressed pool size, or compressed pool pages.

9. The method of claim 1, wherein the at least one resource type comprises a hypervisor and the at least one performance parameter associated therewith comprises at least one of global CPU capacity, kernel mode time, user mode time, or total CPU time.

* * * * *